April 25, 1967     R. WIKEN     3,315,543
HOUSING FOR MULTIPLE-PINION GEAR DRIVES
Filed June 24, 1964     2 Sheets-Sheet 1

INVENTOR
RALPH WIKEN

BY

ATTORNEY

April 25, 1967 R. WIKEN 3,315,543
HOUSING FOR MULTIPLE-PINION GEAR DRIVES
Filed June 24, 1964 2 Sheets-Sheet 2
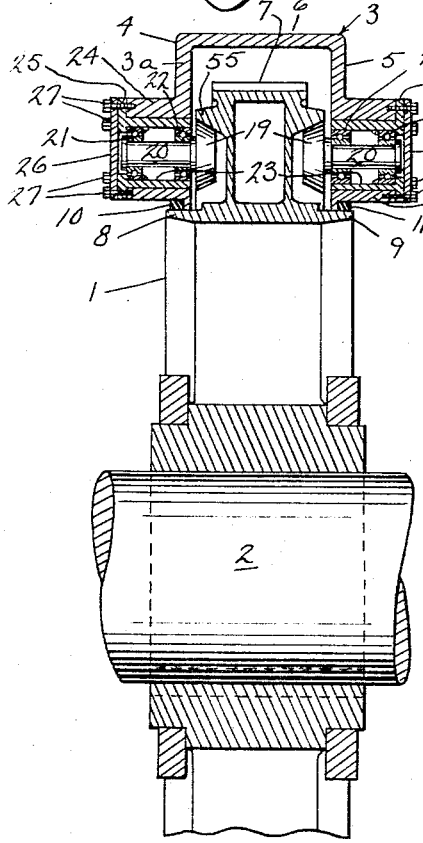
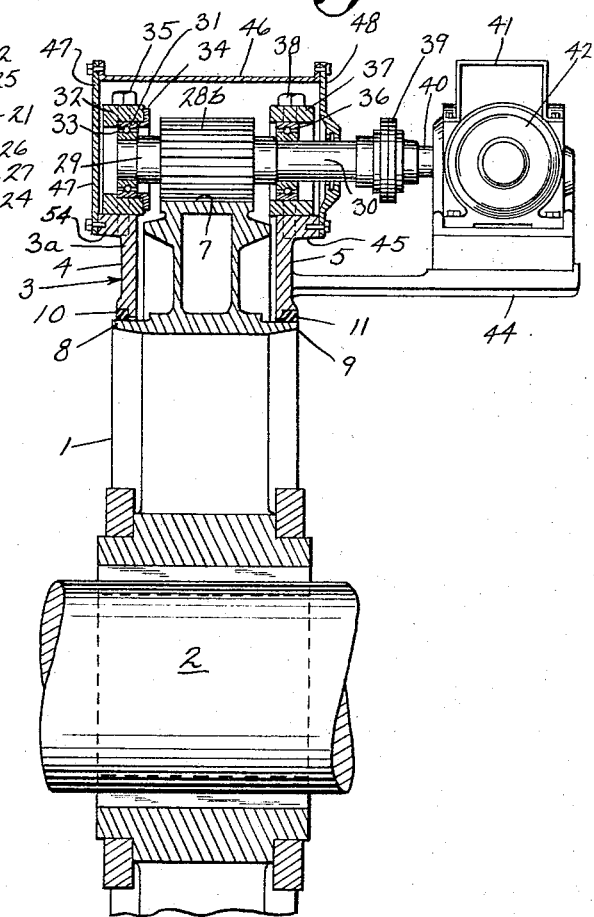
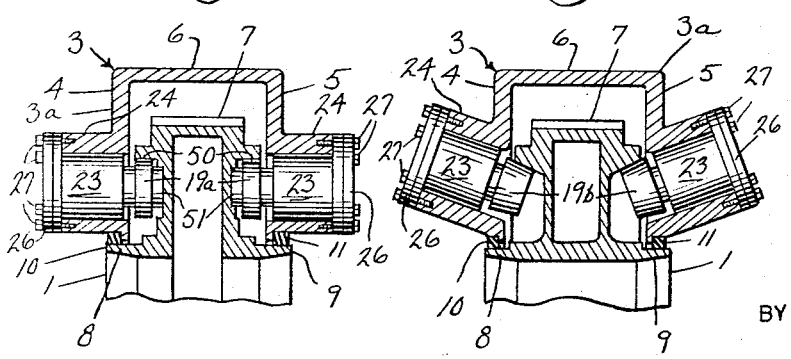
INVENTOR
RALPH WIKEN
ATTORNEY

United States Patent Office 3,315,543
Patented Apr. 25, 1967

3,315,543
HOUSING FOR MULTIPLE-PINION GEAR DRIVES
Ralph Wiken, Bayside, Wis., assignor to The Falk Corporation, Milwaukee, Wis., a corporation of Wisconsin
Filed June 24, 1964, Ser. No. 377,540
6 Claims. (Cl. 74—665)

This invention relates to a gear drive of the type wherein a large gear is driven by a plurality of pinions; more particularly, this invention relates to a unique system for mounting a group of pinions in driving relation to the gear with which they are engaged.

Some types of drives utilize a large gear, often referred to as a bull-gear, mounted on a shaft and driven by a plurality of pinions in which each pinion is driven by an individual motor and speed reducer. A typical application for a drive of this type is for use in driving a basic oxygen furnace for steel making, in which six or eight, and sometimes more, pinions are used to drive the gear. In a usual prior art arrangement of this type, each pinion and its accompanying motor-speed reducer combination is mounted on a structure that is supported on the shaft which carries the gear driven by the pinions. This supporting structure will generally include a number of spaced ring-like elements that are supported from the shaft in suitable shaft bearings, together with various platforms, braces, etc. attached to the ring-like elements.

The present invention has as its principal object the elimination of shaft-mounted structure for supporting pinions and their driving appliances in a multiple pinion gear drive of the above type.

Other important objects of this invention are to provide, in a gear drive of the type including a gear mounted on a shaft, a plurality of pinions drivingly engaged with the gear, and a motor and speed reducer for driving each pinion: (1) a housing that is supported independently of the shaft, which housing encloses at least the teeth of the gear and supports the pinions and their associated motors and speed reducers; (2) rollers for supporting the housing on the gear so as to stabilize the housing during operation of the drive, including the provision of various types of rollers to obtain differing ratios of sliding friction to rolling friction; (3) a housing of the foregoing type that can also be adapted to include a substantially lubricant-tight and dirt-tight seal with the sides of the gear which it covers, so as to provide a fluid tight and dirt-free enclosure for the drive; and (4) suitable stationary means for engaging the housing at each end thereof and restricting its rotation during operation of the gear drive, which means are independent of the shaft on which the gear is mounted and enable omni-directional articulation of the housing.

Briefly, the objects of this invention are accomplished through the provision of a housing that encloses at least the teeth of the gear in a drive of the subject type and has vertical wall portions on each side of the gear in which are journalled rollers that engage the sides of the gear to support and stabilize the housing; the pinions for driving the gear are also journalled in the housing and the motors and speed reducers for driving the pinions are supported from the housing.

The foregoing and other more specific objects will appear in the description which follows. In the description, reference is made to the accompanying drawings which form a part hereof and in which there are shown by way of illustration, several specific forms in which this invention may be practiced. These forms will be described in detail to enable those skilled in the art to practice this invention, but it is to be understood that those skilled in the art may devise other embodiments of this invention and make changes in the embodiments described herein without departing from the true scope of the present invention. The scope of this invention is best defined by the appended claims and limitations set out in the following detailed description need not be taken in a limiting sense except insofar as they may be incorporated in the claims.

In the drawings:

FIG. 2 is a view in cross section, with parts broken away, taken along the plane of line 2—2 in FIG. 1, looking in the direction of the arrows;

FIG. 3 is a view in cross section taken along the plane of line 3—3 of FIG. 1, looking in the direction of the arrows;

FIG. 4 is a partial sectional view with parts broken away showing an alternate form of roller suitable for this invention, taken along the plane of line 2—2; and FIG. 5 is also a partial sectional view, with parts broken away, taken along the plane of line 2—2 and illustrating a third form of rollers suitable for the practice of this invention.

Figure 1:
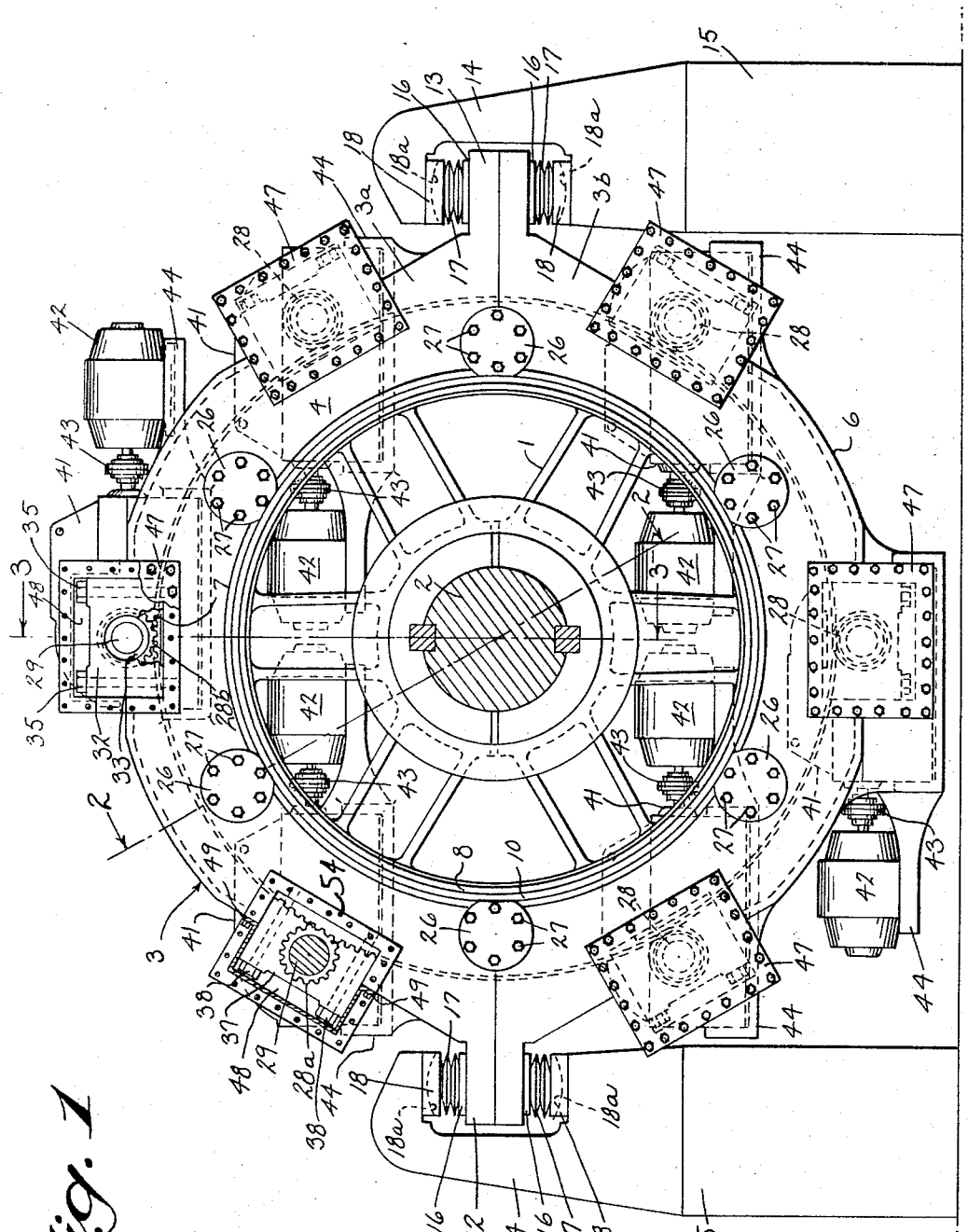
FIG. 1 is a front view in elevation, partly in section and with parts broken away, illustrating a gear drive comprising a gear attached to a shaft and a plurality of pinions for driving the gear, and including a housing for supporting the pinions in accordance with the present invention.

FIG. 1 shows a gear 1 attached to a shaft 2, with a housing 3 enclosing the outer portion of the gear. The housing 3 is shown as a split housing including an upper half 3a and a lower half 3b joined together along a horizontal center line and will be hereinafter referred to as if a unitary structure. Turning now to FIG. 2, the housing 3 includes a pair of spaced side walls 4 and 5 joined together by an outer peripheral wall 6, these three wall elements of the housing being arranged to cover the teeth 7 and parts of the sides of the gear. An annular flange 8 projects from one side of the gear 1 and a similar flange 9 projects from the opposite side. As indicated in FIGS. 2 and 3, the side wall 4 of the housing extends to just above the outer edge of the flange 8 and the side wall 5 of the housing extends to just above the outer edge of the flange 9. Annular seals 10 and 11 are fastened to the housing to form tight seals between side wall 4 and the flange 8 and between side wall 5 and flange 9 respectively which will act to retain lubricant in the housing and exclude dirt from entering the housing. The disposition of the side walls 4 and 5 and outer wall 6 of the housing 3 are such that the gear 1 may freely rotate while the housing is retained stationary by means hereinafter described.

In order to eliminate shaft-mounted structure, the present invention includes rollers between the housing 3 and the gear 1 to support and stabilize the housing on the gear, independently of the drive shaft. Referring now to FIG. 2, a plurality of rollers 19 are journalled in the housing 3 in such a manner that their roller surfaces contact the sides of the gear 1. During normal operation, the weight of the housing is supported by the rollers, although this can vary. All of the rollers and their supporting structure are the same and, hence, the following description will be with reference to only one such roller, it being understood that it pertains to all rollers for the housing. A roller 19 includes an integral shaft 20 that is journalled in a pair of suitable bearings 21 and 22 contained within a sleeve 23. The sleeve 23 is mounted in a cylindrical holder 24 that may be formed as an integral part of the housing, as shown, or may be fabricated separately and attached to the housing. The sleeve 23 includes an annular collar 25 that fits over the end of the holder 24. A cover plate 26 and bolts 27 secure the sleeve 23 to the holder 24 through the collar 25 in the manner indicated in the drawings. The roller 19 bears against an annular flange 55 formed as part of the gear 1 and the roller is mounted so as to be freely rotatable during operation of the gear. Preferably, the flange 55 is machined along its surface in contact with the roller to provide a good rolling surface for the roller. Referring to FIG. 1, there are six rollers 19 supported from the wall 4 of the housing, as indicated by the six cover plates 26, and there is an equal number of rollers 19 supported about the opposite side wall 5 of the housing. While there should be a plurality of rollers attached to the housing and bearing against the sides of the gear according to this invention, the invention is not limited to any specific number.

Returning to FIG. 1, trunnions 12 and 13 project from opposite ends of the housing 1, and each trunnion extends into the jaw of a stationary support member 14 mounted on a foundation 15. The foundations and support members are independent of the shaft 2 that is being driven by the gear 1. A suitable foundation would comprise a sturdy concrete structure built underneath the machine driven by the gear drive. Bearing assemblies hold each trunnion member within the jaw of its respective stationary support member in the manner indicated in the drawings and each bearing assemblies includes a first bearing block 16, a spring 17 and a second bearing block 18. The springs 17 preferably comprise a so-called Belleville spring washer system as indicated schematically in the drawings. The second bearing blocks 18 comprise two members movable relative to one another and formed to have a spherical seat between them as indicated by the curved dotted line 18a across each bearing block 18, to thereby permit centering of the trunnions in their supporting structure. Two bearing assemblies are shown for each trunnion, one on each side, but additional bearing assemblies may be included in side by side relation, depending on the nature of any particular application.

Torque reaction forces developed during operation of the gear drive will be transmitted to the housing and tend to rotate it relative to the drive shaft 2. These twisting forces are resisted by stationary support members, and which cooperate with the trunnion members to act as means for restricting rotation of the housing during operation of the gear drive enclosed by the housing. The bearing assemblies between the trunnions of the housing and the stationary support members are adapted to enable omni-directional articulation of the housing as it is being held steady. This permits adjustment of the housing position to compensate for changes in shaft runout (i.e. axial movement) due to variations in load, power, error in initial assembly of the installation, wear etc., so that they will not adversely affect the position of the housing in relation to the gear. While other forms of bearing assemblies besides that described above will suggest themselves to those skilled in the art, they should include provision for such omni-directional articulation of the housing for most satisfactory operation.

As indicated in FIG. 1, the gear 1 is driven by six pinions 28, equally spaced about the gear, and each pinion is supported from and journalled in the housing 3 in the manner hereinafter described. Each pinion is the same and a typical pinion 28 and its supporting structure is shown in FIG. 3, which pinion includes a neck portion 29 projecting from one end and a shaft 30 projecting from the opposite end. The neck portion 29 is journalled in a bearing 31 that is fixed in a bearing cartridge 32. The bearing 31 contacts an internal shoulder 33 formed as part of the bearing cartridge and is held against the shoulder by means of a keeper ring 34 located on the opposite side of the bearing and fastened to the cartridge. In this fashion the bearing 31 is held in place and restricted against axial movement. A bolt 35 passes through the bearing cartridge on one side of the bearing and fastens the cartridge to the wall 4 of the housing; there should be one such bolt on each side of the bearing to hold the cartridge firmly in place in the housing. At the other end of the pinion, the projecting shaft 30 is journalled in a bearing 36 that is held in a bearing cartridge 37. A bolt 38 attaches the bearing cartridge 37 to the wall 5 of the housing; there being one such bolt 38 on each side of the bearing for this purpose. As indicated in the drawing, the bearing 36 is mounted in a fashion to permit some degree of axial movement, that is, it is mounted as a floating bearing. The cartridges shown in the drawings are non-split cartridges with straight sides that provide for easy assembly and disassembly in case of repair and also act as a means for transmitting the tangential load directly to the housing.

The shaft 30 of each pinion 28 is connected through a shaft coupling 39 to the low speed shaft 40 of a speed reducer 41. Speed reducer 41 is driven by an electric motor 42 connected thereto through shaft coupling 43 (see FIG. 1). Each speed reducer 41 and motor 42 is mounted on a platform 44 that is attached to a wall of the housing 3, herein shown as wall 5 of the housing; other suitable forms of mounting members can be used to attach the speed reducer motor combination to the housing. As indicated in FIG. 1, the various motors and speed reducers are arranged to counterbalance one another as much as possible and to exert a minimum tipping moment on the housing and its supporting structure. Although six pinions, each with its own speed reducer, and motor combination, are shown herein, a different number of such combinations may be used with this invention.

Suitable covering panels are provided around each pinion so that they will be entirely enclosed within the housing 3. The bearing cartridges 32 and 37 are bolted to a projecting portion 54 and 45 of the side walls 4 and 5 respectively of the housing. Returning to FIG. 1, each projection 54 is generally U-shaped so as to contact the bearing cartridge along its bottom edge and partially along each of its end surfaces; projection 45, not visible in FIG. 1, is the same as projection 54. The outer wall 6 of the housing has an opening at each pinion station so that the pinions can be properly intermeshed with the gear. To complete the closure about this opening, a cover plate 46, a generally U-shaped member, extends over the top of each pinion and has out-turned end portions 49 at each end that are attached to the outer wall 6. A front plate 47 is bolted to the cover plate 46 about approximately its upper half and bolted to the projection 54 about approximately its lower half to close one end of each pinion station and, similarly, a rear plate 48 is bolted about approximately its upper half to the cover plate 46 and to the projection 45 of the side wall 5 about approximately its lower half to close the other end and complete the closure about each pinion. The rear plate 48 has an aperture through which the shaft 30 of each pinion extends for driving connection to the speed reducer. In FIG. 1, the pinion 28a located near the top of the gear 1 is shown with its front plate 47 removed so as to clarify the construction of the cover plate 46 and projection 54, and the remainder of the pinion stations are illustrated with their respective front plates 46 in place except that pinion 28b at the top of the gear has a portion broken away to show some of the structure around the pinion.

The rollers serve to support and stabilize the housing during operation of the gear drive to aid in keeping it in a satisfactory position during such operation. Theoretically, when the pinions and gear have spur or herringbone teeth, the rollers would carry no load except the tipping moment that may arise from the weight of each pinion drive, i.e. the motor and speed reducer for each pinion and their supporting structure. Symmetrical arrangement of the respective pinions and their associated equipment can reduce this tipping moment. However, when the pinions and gear have single helical teeth, the rollers will carry the thrust load, which will be uniformly distributed over all rollers on either one side of the gear or the other, depending on the direction of rotation of the gear drive.

As described earlier, annular seals 10 and 11 can be attached to the housing to provide a fluid-tight seal between the housing and the gear. This feature enables the housing to also act as a lubricant chamber for the pinions and the rollers. Various types of lubrication systems, both pressure and non-pressure, can be used to supply lubricating oil to inside the housing from one or more positions around the housing. (A number of suitable systems will suggest themselves to those skilled in the art, and none is illustrated herein.) The annular seals will then serve to prevent leakage of lubricant from the housing. Naturally, the various covering panels about each pinion should preserve the fluid-tight integrity of the housing when a lubrication system is incorporated.

Alternate roller configurations may be used with this invention and two forms other than that of FIG. 2 are depicted in FIGS. 4 and 5. The rollers 19a of FIG. 4 are cylindrical and engage the sides of the gear along a peripheral portion 50 and along an end portion 51. The rollers 19b of FIG. 5 have peripheral surfaces that are tapered to intersect at a common point on the axis of the shaft 2 in order to reduce sliding and they are mounted in the housing at an angle so as to engage the sides of the gear along only their tapered peripheral surfaces. The manner of mounting the rollers 19a and 19b in the housing is the same as for the rollers 19 and the description thereof will not be repeated. The shape of the flanges on the gear that the rollers contact should, of course, be complementary to the outline of the roller surfaces which they engage. The various roller configurations are illustrated herein to indicate that the ratio of sliding friction to rolling friction can be varied if desired.

There has thus been described a novel housing, in a gear drive of the type including a large gear driven by a plurality of pinions, which is capable of satisfying the objects of this invention. The housing herein illustrated is mounted independently of the shaft driven by the large gear. It is held in place by rollers journalled in the housing and which engage the sides of the large gear. Means for restricting or preventing rotation of the housing during operation of the gear drive are also provided and these include joints that enable omni-directional articulation of the housing during operation of the drive to permit the housing to adjust to varying conditions and adapt a suitable position for each. In the embodiment described, the means for restricting rotation of the housing comprise a trunnion and stationary support member at opposite ends of the housing and these are shown as resisting reaction torque forces only; however, the entire assembly may be designed with said means also supporting some of the weight of the housing and appliances attached to the housing so that the rollers need not support the entire weight of such items. The plurality of pinions used in the gear drive are each supported in the housing when placed in driving engagement with the gear. Additionally, each pinion is driven by a motor and speed reducer, both of which are supported from the housing by suitable mounting members. The housing can be made to be fluid-tight to be used as a lubricant chamber and dirt-proof to protect the various drive elements, in addition to its other functions. Thus, the novel housing of the present invention includes a number of important features not now attainable with the prior art systems for mounting the pinions in a gear drive of the subject type. It is to be understood that it is intended to cover all changes and modifications of the examples of this invention herein chosen for the purpose of illustration which do not constitute a departure from the true spirit and scope of this invention.

I claim:

1. In a gear drive of the type including a gear mounted on a shaft, a plurality of pinions for driving the gear, and a speed reducer and motor associated with each pinion for driving the same, the improvement comprising:
   (1) a housing surrounding the teeth and portions of each side of the gear,
   (2) a plurality of rollers journalled in the housing and having roller surfaces contacting the sides of the gear, some of the rollers contacting one side of the gear and the others contacting the opposite side of the gear, said rollers being enclosed within the housing;
   (3) means for restricting rotation of the housing during operation of the gear drive including, on each side of the housing, a member projecting from the housing and a stationary support member for receiving each such projecting member, said stationary support members being independent of the shaft on which the gear is mounted;
   (4) mounting members attached to the housing and to which the motor and speed reducer associated with each pinion are attached; and wherein
   (5) each pinion is supported in the housing and connected to its associated speed reducer.

2. In a gear drive of the type including a gear mounted on a shaft, a plurality of pinions for driving the gear, and a speed reducer and motor associated with each pinion for driving the same, the improvement comprising:
   (1) a housing surrounding the teeth and portions of each side of the gear, and a trunnion extending from each of at least two opposed sides of the housing;
   (2) a plurality of rollers journalled in the housing and having roller surfaces contacting the sides of the gear, some of the rollers contacting one side of the gear and the others contacting the opposite side of the gear, said rollers being enclosed within the housing;
   (3) stationary support members for cooperating with the trunnions to restrict the housing against rotation during operation of the gear drive, each stationary support member being supported independently of the shaft on which the gear is mounted, and including a jaw in which the trunnion on its adjacent side of the housing is received;
   (4) mounting members attached to the housing and to which the motor and speed reducer associated with each pinion are attached; and wherein
   (5) each pinion is supported in the housing and connected to its associated speed reducer.

3. In a gear drive of the type including a gear mounted on a shaft, a plurality of pinions for driving the gear, and a speed reducer and motor associated with each pinion for driving the same, the improvement comprising:
   (1) a housing surrounding the teeth and portions of each side of the gear, and a member extending from each of two opposed sides of the housing;
   (2) a plurality of rollers journalled in the housing and having roller surfaces contacting the sides of the gear, some of the rollers contacting one side of the gear and the others contacting the opposite side of the gear, said rollers being enclosed within the housing;
   (3) stationary support members for cooperating with said members extending from opposed sides of the housing to hold the housing steady during operation of the gear drive, each stationary support member being supported independently of the shaft on which the gear is mounted and including a jaw in which the member extending from the housing is received;
   (4) bearing assemblies positioned between the members extending from each side of the housing and the jaws of the stationary support members and adapted to allow omni-directional articulation of the housing as it is being held steady;
   (5) mounting members attached to the housing and to which the motor and speed reducer associated with each pinion are attached; and wherein
   (6) each pinion is supported in the housing and connected to its associated speed reducer.

4. In a gear drive of the type including a gear mounted on a shaft, a plurality of pinions for driving the gear, and a speed reducer and motor associated with each pinion for driving the same, the improvement comprising:
   (1) a housing surrounding the teeth and portions of each side of the gear;
   (2) a plurality of rollers journalled in the housing and having roller surfaces contacting the sides of the gear, some of the rollers contacting one side of the gear and the others contacting the opposite side of the gear, said rollers being enclosed within the housing;
   (3) means for restricting rotation of the housing during operation of the gear drive, which means are independent of the shaft on which the gear is mounted;
   (4) a plurality of platforms attached to the housing, there being one platform for each pinion with the motor and speed reducer associated with each pinion mounted on a platform; and wherein
   (5) each pinion is supported in the housing and connected to its associated speed reducer.

5. In a gear drive of the type including a gear mounted on a shaft, a plurality of pinions for driving the gear, and a speed reducer and motor associated with each pinion for driving the same, the improvement comprising:
   (1) a housing surrounding the teeth and portions of each side of the gear, and a trunnion extending from each of two opposed sides of the housing;
   (2) a plurality of rollers journalled in the housing and having roller surfaces contacting the sides of the gear, some of the rollers contacting one side of the gear and the others contacting the opposite side of the gear, said rollers being enclosed within the housing;
   (3) stationary support members for cooperating with the trunnions to restrict the housing against rotation during operation of the gear drive, each stationary support member being supported independently of the shaft on which the gear is mounted, and including a jaw in which the trunnion on its adjacent side of the housing is received;
   (4) a plurality of platforms attached to the housing, there being one platform for each pinion with the motor and speed reducer associated with each pinion mounted on a platform; and wherein
   (5) each pinion is supported in the housing and connected to its associated speed reducer.

6. In a gear drive of the type including a gear mounted on a shaft, a plurality of pinions for driving the gear, and a speed reducer and motor associated with each pinion for driving the same, the improvement comprising:
   (1) a housing including an outer wall surrounding the teeth of the gear and having a pair of spaced side walls extending from the outer wall, there being one side wall opposite each side of the gear;
   (2) an annular seal positioned between each side wall of the housing and its respective adjacent side of the gear to provide a fluid-tight seal therebetween;
   (3) a plurality of rollers journalled in the housing and having roller surfaces contacting the sides of the gear, some of the rollers contacting one side of the gear and the others contacting the opposite side of the gear, said rollers being enclosed within the housing;
   (4) means for restricting rotation of the housing during operation of the gear drive including, on each side of the housing, a member projecting from the housing and a stationary support member for receiving each such projecting member, said stationary support members being independent of the shaft on which the gear is mounted;
   (5) mounting members attached to the housing and to which the motor and speed reducer associated with each pinion are attached; and wherein
   (6) each pinion is supported in the housing and connected to its associated speed reducer.

References Cited by the Examiner

UNITED STATES PATENTS

| | | | |
|---|---|---|---|
| 1,359,553 | 11/1920 | White | 74—606 |
| 2,327,777 | 8/1943 | Falk | 74—606 |
| 2,332,172 | 10/1943 | Schmidt et al. | 74—606 X |
| 2,441,901 | 5/1948 | Petersen | 74—410 X |
| 3,149,499 | 9/1964 | Schmitter | 74—409 |
| 3,151,502 | 10/1964 | Kron et al. | 74—411 |
| 3,186,255 | 6/1965 | Schmitter et al. | 74—606 |

FOREIGN PATENTS 1,120,309  12/1961  Germany.

DAVID J. WILLIAMOWSKY, *Primary Examiner.*

J. R. ENEFIEL, *Assistant Examiner.*